US006701143B1

(12) United States Patent
Dukach et al.

(10) Patent No.: US 6,701,143 B1
(45) Date of Patent: Mar. 2, 2004

(54) APPARATUS, METHODS, AND COMPUTER PROGRAMS FOR DISPLAYING INFORMATION ON MOBILE SIGNS

(75) Inventors: Semyon Dukach, Boston, MA (US); Matt W. D. Mankins, Somerville, MA (US); Leonid Fridman, Somerville, MA (US); Salvatore A. D'Agostino, Cambridge, MA (US); Brad Harkavy, Cambridge, MA (US); Edward W. Porter, Boston, MA (US)

(73) Assignee: Vert, Inc., Boston, MA (US)

( * ) Notice: Subject to any disclaimer, the term of this patent is extended or adjusted under 35 U.S.C. 154(b) by 230 days.

(21) Appl. No.: 09/618,862

(22) Filed: Jul. 18, 2000

Related U.S. Application Data

(60) Provisional application No. 60/170,914, filed on Dec. 15, 1999.

(51) Int. Cl.[7] .................................................. H04M 3/42

(52) U.S. Cl. ................................ 455/414.2; 455/414.1; 455/456.1; 455/456.4

(58) Field of Search ................................ 455/456, 414, 455/414.1, 414.2, 456.1, 456.4

(56) References Cited

U.S. PATENT DOCUMENTS 5,579,535 A * 11/1996 Orlen et al. ............... 455/33.1
5,617,086 A * 4/1997 Klashinsky et al. ........ 340/907
5,664,948 A * 9/1997 Dimitriadis et al. ........ 434/307
5,956,629 A * 9/1999 Morrison ................. 455/166.2
6,060,993 A * 5/2000 Cohen ...................... 340/691.6
6,088,008 A * 7/2000 Reeder ........................ 345/33
6,327,474 B1 * 12/2001 Ruutu et al. ................ 455/456
6,414,602 B2 7/2002 Polyakov

* cited by examiner

*Primary Examiner*—William Trost
*Assistant Examiner*—James D Ewart
(74) *Attorney, Agent, or Firm*—Trevor D. Arnold; Frederick C. Williams; Yan Lan

(57) ABSTRACT

A system of advertising information on one or more mobile vehicles as a function of the vehicle's location. The system comprises mobile units and a central system for controlling the displays on the mobile units. The mobile units include displays visible from the outside of the vehicle, a controller, and a wireless communication system for repeatedly transmitting a locator signal to and receiving display-selection messages from the central system. The central system includes a wireless communication system for receiving locator signals from the mobile units, a memory and a processor. The central system determines a zone in which the mobile unit is located, selects a display to be shown by the mobile unit based on the zone that the mobile unit is located, and transmits a display-selection message to the mobile unit identifying a selected display message to be shown on the mobile unit's display.

28 Claims, 9 Drawing Sheets

Mobile Unit's Controller Main Loop~186

- -...
- -If receive message from central system~188
    - -Read message to determine its type~190
    - -If message is a display-selection message~192
        - -For each display message identified in display-selection message~194
            - -If identified display message is part of display-selection message~196
                - -cause display message to be shown on display~198
            - -else if identified display message is stored in cache memory~200
                - -Cause identified display message's data to be read from memory and shown on identified display~202
            - -else if the identified display message is a message in a broadcast data stream~204
                - -cause the data-stream receiver to receive the identified display message~206
                - -cause the identified display message to be shown on the mobile unit's display in real time~208
            - -else send a locator signal indicating mobile unit does not have requested message~210
        - -if message contains a locator-signal period~212
            - -set mobile unit's locator-signal period to period specified in signal~214
    - -if message is a caching message~216
        - -cache display messages identified in caching message~218
    - -if message is a locator-signal-period message~220
        - -set mobile unit's locator-signal period to period specified in signal~222
    - -...

FIG. 9

-Display-selection message~224

- -Header~226
- -Mobile Unit ID~228
- -1st Display Message ID~230
- -2nd Display Message ID~232
- -[locator-signal period]~234
- -...

FIG. 10

-Display-selection message~224A

- -Header~226
- -Mobile Unit ID~228
- -1st Display Message~236
- -2nd Display Message~236
- -[locator-signal period]~234
- -...

FIG. 11

-locator signal~240

- -header~242
- -mobile unit ID~244
- -GPS coordinates~246
- -ID of display messages currently being shown on each display ~248
- -Vehicle speed~250
- -[missing selected display messages]~252
- -[intended destination]~254

FIG. 12

-Mobile Unit's locator-signal daemon~260
-if time since last transmission of a locator signal equals the locator-signal period~261
-transmit a locator signal including~262

FIG. 13

-Mobile Unit's vehicle destination-input daemon~264
-if vehicle destination has been entered~266
-send a wireless locator signal to central system also informing it of the intended location~268

FIG. 14

-Mobile Unit's speed monitoring daemon~270
-read vehicle speed generated by speed sensor~272
-if vehicle speed or direction of mobile unit has change by more than a certain amount~274
-vary locator-signal period accordingly~276

FIG. 15

-Central System's Locator Signal Response Programming~280
- -if receive a locator signal~282
  - -associate a geographic location with the mobile unit which sent the signal~284
  - -determine which geographic zones the location is in~286
  - -if display messages which locator signal indicates are being shown on mobile unit are different than those in the last display-selection message sent to the mobile unit~288
    - -indicate difference in billing data base~290
  - -if the mobile unit is in a geographic zone for which different display message should be shown than those in the locator signal~292
    - -select the display messages to be displayed by the mobile unit based on the zone and current time~294
    - -send a display-selection message to the mobile unit identifying the selected display messages to be shown on the mobile unit~296
    - -record zone, time, and display messages associated with display-selection message in billing data base~298
  - -record information about the location of the mobile unit derived from its locator signal in the mobile unit location history data base~300
  - -if variable frequency locator signals are being used~302
    - -determine, from locator signal, a distance from the mobile unit to the boundary of its current geographic zone~304 I
    - -based on this distance and the speed of the vehicle, calculate the length of time before the mobile unit is likely to exit its current geographic zone~306
    - -based on this length of time, calculate a locator-signal period, indicating how long it should be before the given mobile unit transmits each of one or more subsequent locator signal~308
    - -send a wireless locator-signal-period message to the given mobile unit containing said locator-signal period~310
  - -if locator signal includes intended destination~312
    - -select a subset of a larger set of display messages which are to be cached by storage in the memory of a given mobile unit as a function of one or more of said geographic locations which have been associated with the given mobile unit and of intended location~314
    - -send a wireless caching message to the given mobile unit informing the given mobile unit to cache the selected subset of display messages~316
  - . . .

FIG. 16

-Central System's Bill generation Programming~320

-based on the billing records, create bills for individual advertising clients with the amount of each such bill being a function of the number and length of displays of their display messages, and the time and zones in which such displays were made~322

FIG. 17

APPARATUS, METHODS, AND COMPUTER PROGRAMS FOR DISPLAYING INFORMATION ON MOBILE SIGNS

RELATED APPLICATION

This application is a continuation-in-part of, and claims priority under 35 U.S.C. .§119(e) from, the co-pending U.S. provisional application Ser. No. 60/170,914 filed by Semyon Dukach et al. on Dec. 15, 1999 and entitled "Apparatuses, Methods, and Computer Programs For Displaying Information On Signs" (hereinafter "The Provisional Application") The Provisional Application is also hereby incorporated by reference.

FIELD OF THE INVENTION

The present invention relates to a system for displaying information to the public.

BACKGROUND OF THE INVENTION

Communication of information to the public is a major industry. One of the major means of such communications is by publicly visible signs, including advertising signs. Signs have been in use for centuries, and have performed a valuable service of informing consumers about choices that are available to them. But advances in technology have made traditional signs seem somewhat out of date.

U.S. Pat. No. 6,060,993 issued to Eyal Cohen (the "Cohen Patent") discloses one possible system for displaying messages in advertisements on mobile signs, such as those placed on the tops of motor vehicles such as taxis. In this system a geographic area is divided up into separate zones and when a mobile unit makes a transition from one zone into another the controller located on the mobile unit determines when it has made such a transition based on a positioning system within the mobile unit, on a series of geographic zone definitions which it stores in its memory, and on a schedule indicating which messages are to be shown in which zones at which times. The Cohen patent is hereby incorporated herein by reference in its entirety.

The system described in the Cohen patent would appear to have many benefits, but it also appears to be rather complex, and, thus, it is desirable to have a system capable of displaying advertisements on mobile units as a function of their location which did not have as much complexity as the Cohen patent's system.

SUMMARY OF THE INVENTION

It is an object of the present invention to provide for more flexible usage of signs.

It is another object of the invention to provide a system for displaying messages on mobile signs as a function of their location which reduces the amount of memory storage and computation required by the mobile units which make such mobile displays.

The present invention relates to a system for displaying messages on one or more mobile units as a function of the mobile unit's location. The system comprises the following: at least one mobile unit in the form of a vehicle capable of moving in geographic space and a central system for controlling the displays on some or all of the mobile units. The mobile unit includes a display visible from outside the vehicle; a wireless communication system, and a controller. The wireless communication systems includes a transmitter for repeatedly transmitting a locator signal which enables a central system to determine the mobile unit's location and a receiver for receiving messages from a central unit. The controller is programmed to control the contents shown on said display; read messages received by the wireless receiver; and respond to a display-selection messages from the central system by causing said display to show the selected message identified in such a message. The central system includes a wireless communication; a memory, and a processor. The wireless communication system includes circuitry for receiving wireless messages from (including the locator signals) and circuitry for sending wireless messages to mobile units. The memory stores a plurality of geographic zone definitions and an indication of which of a plurality of messages is to be displayed by one or more of said mobile units in each of said zones. The processor is programmed to associate a geographic location with a given mobile unit based on information derived from the receipt of a locator signal from the given mobile unit; to determine which of a plurality of geographic zones the geographic location associated with the given mobile unit is located; to select a given display message from a plurality of messages to be displayed by the given mobile unit based on the geographic zone in which the given mobile unit's associated geographic location is located; and to send a wireless display-selection message to the given mobile unit identifying a selected display message to be shown on the given mobile unit's display.

In some embodiments of the invention the mobile unit's display is mounted on the exterior of the mobile unit's vehicle, and in some embodiments the mobile unit has a plurality of such displays.

In some embodiments the mobile unit further includes a memory storing a plurality of display messages; and its controller is programmed to respond to a display-selection message from the central system by causing the identified selected display message to be read from memory and shown on the display.

In some embodiments the processor of the central system is programmed to select a sub-set of a larger set of display messages which are to be cached by storage in the memory of a given mobile unit; and to send a wireless caching message to the given mobile unit causing the given mobile unit to cache the selected sub-set of display messages. In some embodiments of the invention all the mobile units could cache the same display messages, but in some embodiments of the invention different mobile units will cache different display messages as a function of such things as their current location, their current destination, and their past history of travel.

Such a caching selection can be made as a function of one or more of the geographic locations which have been associated with the given mobile unit at one or more times, such as its current location, its current location in direction, as derived from a series of locations, or its history of travel over a longer period of time. In some such embodiments, the mobile units can include an input device enabling one of its users to input an intended destination for the mobile unit; the mobile unit's controller is programmed to cause a wireless message to be sent informing the central system of the intended destination; and the caching selection is also made as a function of such an intended destination communicated to the central system by the given mobile unit.

In some caching embodiments of the invention, the central system includes a broadcast transmitter that broadcasts one or more data streams which can be simultaneously received by multiple mobile units; each of these data streams contains one or more display messages; and the caching message sent to a given mobile unit instructs the given mobile unit to cache one or more selected messages from said one or more of the broadcast streams.

In some such embodiments the broadcast transmitter is a UHF television station.

In some caching embodiments of the invention the caching message includes the sub-set of display messages which the central system has selected for caching by the given mobile unit.

In some embodiments of the invention, the display-selection message includes the contents of the given message which the central system has selected to be shown by the given mobile unit to which display-selection message is sent. This content can either be shown live, in real-time as the display-selection messages received, or can be stored and then shown from memory.

In some embodiments of the invention that do not necessarily include a caching scheme of the type described above, the central system includes a broadcast transmitter which broadcasts one or more data streams which can be simultaneously received by multiple mobile units, each of which data streams contains one or more display messages. In such embodiments a display-selection message is addressed to a subset of one or more of said mobile units instructing the members of the subset to display a selected one of the display messages contained in said one of said broadcast data streams; the mobile units includes a data-stream receiver capable of receiving a selected display message from one of said broadcast data streams; and the mobile unit's controller is programmed to respond to the receipt of a display-selection message by: causing the data-stream receiver to receive the display message identified in the selected-display message; and causing the identified display message to be shown on the mobile unit's display. The broadcast transmitter can be a UHF television station. The mobile unit's controller can be programmed to cause the identified display message to be shown on the mobile unit's display in real time as it is received from a data stream.

In some embodiments of the invention said mobile unit includes a GPS system for determining the geographical coordinates of said mobile unit; and said locator signal contains geographical coordinates information derived from said GPS system. In other embodiments of the invention the locator signal broadcast by a mobile unit does not encoded geographical location information; and the central system associates said geographical location which a given mobile unit based on information about the receipt of the locator signal obtained by the wireless communication system which receives such signals.

The mobile unit can have a plurality of displays visible from outside its vehicle (as well as one or more displays visible from within the vehicle). In such embodiments the processor of the central system can contain programming to separately select a given message from a plurality of messages to be displayed on each of said plurality of display; said display-selection message can include information informing a mobile unit display different selected messages on each of its plurality of displays; and the mobile unit's controller contains programming to cause it to responded to a display-selection message from a central system identifying a separate display message to be shown on each of said plurality of displays by causing each of said identified display messages to be shown in a corresponding one of said displays.

In many embodiments of the invention the central system's processor is programmed to select the display message to be shown by a given mobile unit based not only on the geographic zone in which the given mobile vehicle is located but also as a function of the current time. In many such embodiments the central system contains a memory storing a schedule which indicates which messages are to be displayed in which geographic zones at what times; and the central system's processor is programmed to use the information stored in said schedule when making the selection of which display message is to be shown a given mobile unit as a function of both its geographic zone and the current time.

In many embodiments of the invention the central system's processor is programmed to perform record keeping, including keeping record of which display messages are shown by mobile units and when such messages are so shown. Such record keeping commonly also includes keeping record of where individual display messages are so shown and generating billing information from said information about which messages have been displayed at which times.

In some embodiments of the invention the central system's processor is programmed to record information about the location of each of a plurality of said mobile units, derived from the locator signals transmitted by such mobile units, at each of successive times, so as to record a history of the travel of each such mobile unit.

In some embodiments of the invention the central system's processor is programmed to: determine, based on the receipt of a locator signal from a given mobile unit, how close the given mobile unit is to the boundary of the geographic zone in which is located; calculate how long it should be before the given mobile unit transmits each of one or more subsequent locator signal as a function of how close the given mobile unit is to the boundary of the geographic zone in which it is located; and send a wireless locator-signal-period message to the given mobile unit containing the results of said calculation. The controller of the given mobile unit is programmed to respond to the receipt of one of said locator-signal-period messages by causing the timing of the subsequent transmission of one or more of the given mobile unit's locator signals to be controlled as a function of information contained in said locator-signal-period message. In many such systems said calculation of how long it should be before the given mobile unit transmits each of one or more subsequent locator signal is also made as a function of the speed of the given mobile unit. In some of the invention the mobile unit includes a speed sensor cable of determining its speed for this purpose. Other embodiments the central system can determine a mobile unit's speed for this purpose as a function of the amount of distance the mobile unit has travel between the transmission of its most recent locator signals.

In some embodiments of the invention the mobile unit includes a sensor for measuring the speed of the mobile unit; and the mobile unit's controller is programmed to vary the time between the transmission of locator signals as a function of the speed of the vehicle as measured by said sensor.

The present invention includes not only the overall system described above, but also novel sub-parts of that overall system, including the central system and the mobile units. The invention furthermore includes the novel methods of operation performed by cease the overall system and its individual components.

DESCRIPTION OF THE DRAWINGS

These and other aspects of the present invention will become more evident upon reading the following description of the preferred embodiment in conjunction with the accompanying drawings, in which:

FIG. 9 is a highly simplified pseudo-code description of the main loop performed by the controller of the mobile units in some embodiments of the present invention;

FIGS. 10 and 11 are schematic representations of two different embodiments of the display-selection method which can be used by the present invention;

FIG. 12 is a schematic representation of a locator signal which can be used with one embodiment of the present invention;

FIGS. 13–15 are highly simplified pseudo code descriptions of daemons which can by mobile unit's controller's to control the generation of locator signals, the transmission messages regarding the input of intended vehicle destinations, and the setting of locator-signal-period values, respectively;

FIG. 16 is a highly simplified pseudo code description of programming executed by the processor of the central system to respond to the receipt of locator signals from mobile units in some embodiments of the invention; and FIG. 17 is a highly simplified pseudo code description of programming which can be used to cause the central system to generate billing.

DETAILED DESCRIPTION OF PREFERRED EMBODIMENTS

Figure 1:
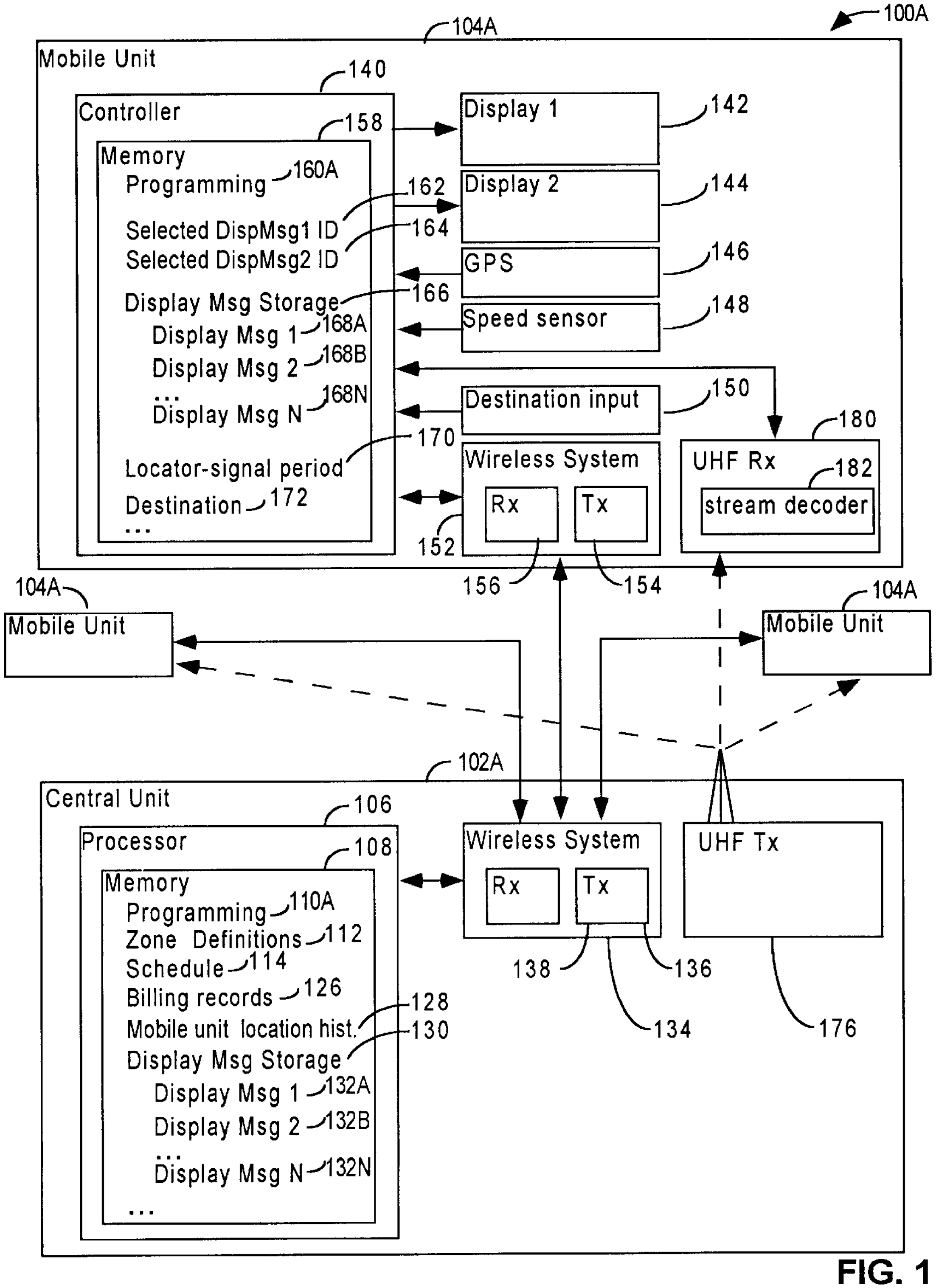
FIG. 1 is a schematic overview of one embodiment of the present invention.

FIG. 1 provides a schematic overview of a system 100 for displaying information on mobile signs according to one embodiment of the present invention. The system 100 includes a central system 102 and one or more mobile units 104 that are controlled by the central system. The central system includes a processor 106 which includes memory 108 which stores programming to control its operation. The processor's memory also includes geographic zone definitions 112 which define the geographic zones in which the system can display different messages. In different implementations geographic zones can be defined differently. In some embodiments they can correspond to zip code or census blocks. In other embodiments they can correspond to the length of a given street along a given block. In some embodiments, zone definitions will tend remained relatively fixed overtime. In other embodiments zone definitions could be redefined frequently, such as daily, or even hourly, to reflect different geographic areas advertisers have an interest in displaying their advertisements.

The central system's memory also includes a schedule 114.

Figure 2:
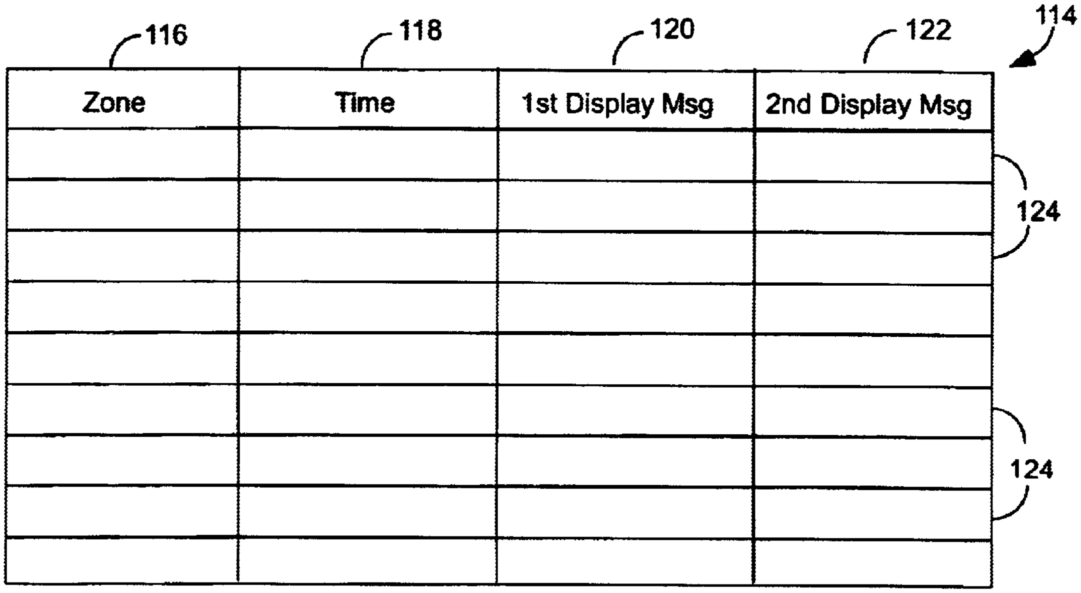
FIG. 2 is a simplified representation of a schedule which can be used by the central system of the embodiment of the invention shown in FIG. 1 to help determine which messages should be displayed by mobile units in each of a plurality of geographic zones at each of a plurality of times.

FIG. 2 illustrates one possible embodiment of the schedule 114 in which the schedule takes the form of a database table comprised of rows corresponding to record in the database, and columns corresponding to individual fields within the records. This table includes a zone column 116 which defines the geographic zone of a given record 124 in the table. The table also includes a time column 118 which identifies the time range during which a given record 124 is to apply. The table further includes columns 120 and 122 which identify the display messages which are to be shown on the separately programmable displays of a given mobile unit in the zone and ask the time indicated in the zone and time fields of the record 124 in which they occur. As those skilled in the computing arts will understand, in other embodiments of the invention the schedule 114 can be a virtually any type of data structure capable of indicating which display messages are to be shown by a mobile unit given information that can include the zone in which it is currently located; the current time; the mobile unit's speed; the number and types of displays which the mobile unit has; the number of the other mobile units currently located in the same zone; the number of cumulative minutes the mobile unit or other mobile units have already displayed a particular message (or other messages from the same or other advertisers) in one or more relevant time periods, either in the current zone or in some large number of zones; and any other information which may be relevant to what messages might be desired on a given mobile unit, given its current location.

As is implied by the paragraph above, in some embodiments of the invention the schedule takes into account how many times one or more messages from a given group of messages have been shown within one or more zones during one or more time periods by one or more mobile units in determining if a given message should be shown by a given mobile unit in a given zone. For example, with such a schedule an advertiser would be able to instruct the system to "Show my message for a total of 1000 minutes total in Wall Street area Monday–Friday 3–5 pm". Another advertiser might request that the system show a set of five different messages for a total of 5000 minutes in four different zones in which it has stores during rush hour over a period of a month. In some such systems the scheduling will attempt to have the desired number of minutes that are shown over a given amount of time distributed relatively evenly across that time.

As FIG. 1 shows, the central system's memory also includes billing records 126. These records indicate which display messages have been shown at what zones at what times, so advertisers can be billed accordingly. The billing records 126 can also include bills addressable to individual advertisers generated from such information.

The central system's memory also includes mobile unit location history 128, which records information about the current and past location of individual mobile units. This information can be used to project the likely travel of an individual mobile unit and, thus, allow such a mobile unit to more efficiently cache display messages for the geographic zones it is likely to travel in.

In different embodiments of the invention different types of display messages can be used. The display messages used with the invention can vary from simple text messages displayed on the low resolution text-based displays, to high resolution still graphic images or high resolution color animated or video messages. The content of the display messages can include not only advertisements, but also other types of messages such as weather and traffic reports (including local traffic reports, such as reports of how many feet till the scene of a traffic jam or the detour), news, public service announcements, and information and entertainment programming.

The central memory also caches display message in a display-message storage 130. As is indicated in FIG. 1 this storage or cache area is used to store or a plurality of individual display messages 132A through 132N after they have been downloaded from the central system. These cache display messages can be used to increase the speed with which mobile units can display selected display messages by preventing the need for the mobile unit to download each such message at the time the mobile unit is instructed to display it. Such caching also has the benefit of decreasing the amount of communication traffic required by the system, sends it often enables messages which are shown multiple times to be downloaded only once.

The central system shown in FIG. 1 further includes a wireless system 134 for transmitting and receiving wireless messages to and from individual mobile units. The wireless system includes both a transmitter 136 and a receiver 138. As will be understood by those skilled in the arts of radio-frequency communication, in many embodiment of the invention the transmitter and receiver of a wireless system will commonly share many components. The wireless system 134 can be any sort of wireless transmitter currently known or hereinafter invented. In many embodiments of the invention, however, the wireless system 134 will be a cellular phone or wireless data system. In such embodiments, many of the components of the wireless system will be part of wireless systems provided by one or more third party phone companies.

In the embodiment shown in FIG. 1 each of the mobile units 104 includes a controller 140; a first and second separately controllable display 142 and 144, respectively; a global positioning system ("GPS") 146, a speed sensor 148 capable of determining the speed of the mobile unit; a destination input device 150, such as a keyboard, enabling a user of the mobile unit to input information defining a desired destination for the mobile unit; and a wireless system 152 which includes a transmitter 154 and a receiver 156 communicating with the central system 102.

The displays 142 and 144 can be virtually any type of display capable of being shown in an electronically encoded image including, for example liquid crystal, LED, gas plasma, electronic ink, and cathode ray tube displays. In some embodiments of the invention, the separately controllable displays 142 and 144 might actually be to separate parts of a single display.

FIGS. 3 through 6 provide various views of one embodiment of the mobile unit 104. In this embodiment the mobile unit is a taxi cab and most of the components identified within the box labeled 104 in FIG. 1 are contained in a car-top unit 174 shown in FIGS. 3 through 6. In this embodiment the mobile unit's first separately controllable display 142 is actually two displays, one located on each of the longer two sides of the triangularly-shaped car-top unit 174. The mobile unit's separately programmable second display 144 corresponds to a smaller display unit which occurs in the back-facing, shorter side of the triangularly shaped car-top box. It should be noted that the vehicle associated with a mobile unit need not be a taxi. In fact, it could include buses, trains, trucks, privately owned passenger cars, boats, airplanes, blimps, and virtually any other type of vehicle.

The mobile unit's controller 140 contains memory 158 which includes programming 160 which controls its operation. It also stores display message IDs 162 and 164, which identify the display messages which are currently to be shown on the mobile unit's two displays 142 and 144. The controller's memory also stores a cache of display messages in the display message storage 166. This cache includes a plurality of display messages 168A through 168N which have been cache after having been downloaded by wireless transmission from the central system 102.

The mobile unit's controller's memory further includes a locator-signal period variable 170, which indicates the length of time which should occur between the generation of successive locator signals. Such locator signals transmitted information about a given mobile unit's status and location to the central system. The mobile unit's memory also stores a destination variable 172, which records information input about an intended destination for the mobile unit's vehicle which has been input into the destination input device 150.

Figure 7:
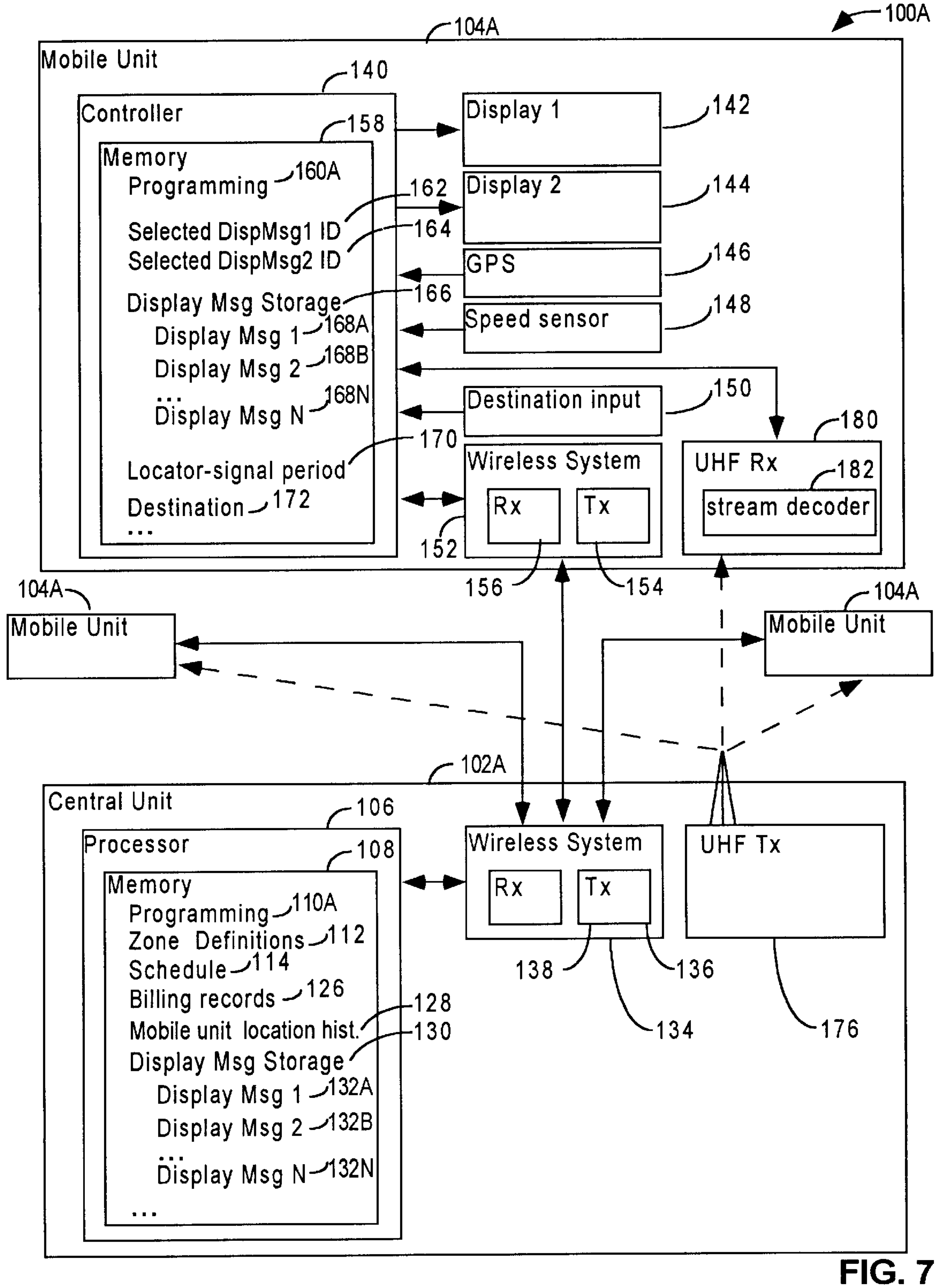
FIG. 7 is a schematic overview of an alternate embodiment of the present invention which uses a UHF transmitter to communicate the content of display messages to its mobile units.

FIG. 7 illustrates an alternate embodiment of the invention's system for displaying information on mobile signs. This embodiment is identical to that shown in FIG. 1 except for the fact that its central system includes a UHF transmitter 176, which can be a licensed UHF television station, and except that its mobile units 104 include a UHF receiver 180 and a stream decoder 182. In this embodiment of the invention the UHF transmitter transmits multiple streams of data of the type shown schematically in FIG. 8.

Figure 8:
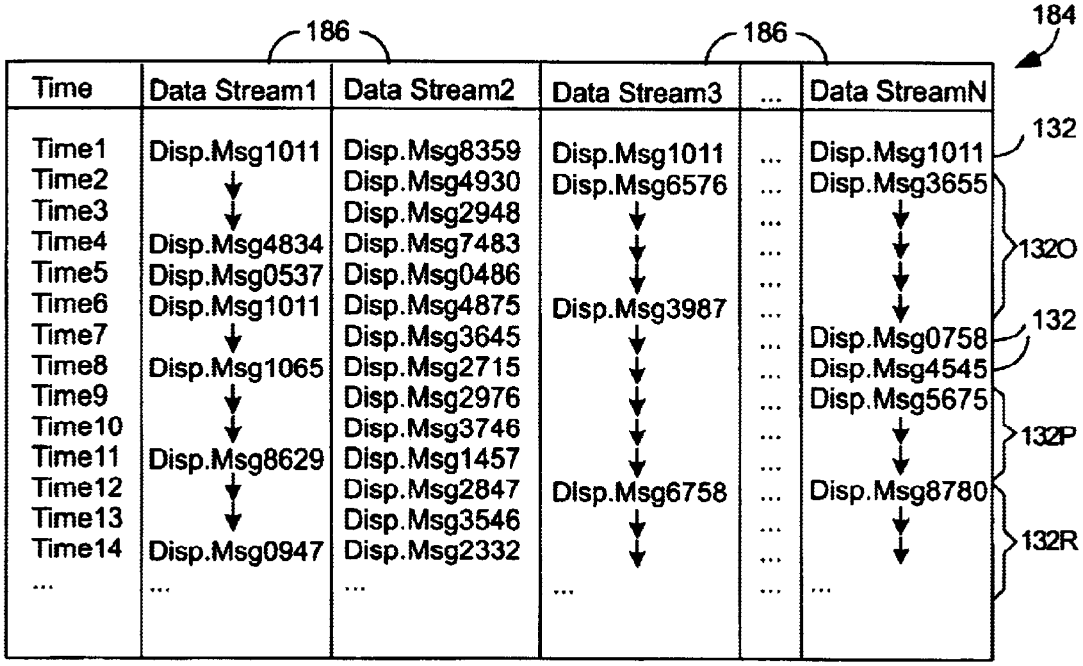
FIG. 8 is a schematic diagram of the multiple streams of display-message content which can be broadcast by the central system in the embodiment of the invention shown in FIG. 6.
Figure 3:
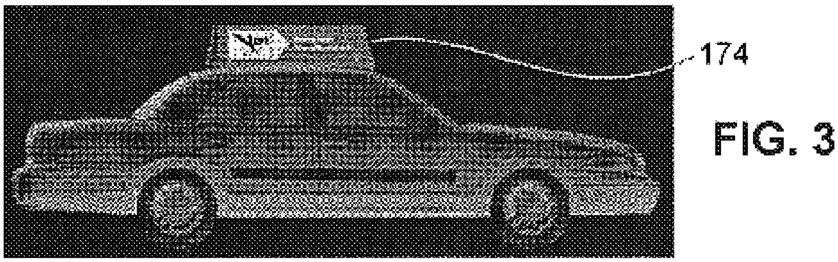
FIGS. 3 through 6 provide, respectively, a side view, two perspective views, and one top view of a mobile unit according to one embodiment of the present invention.
Figure 4:
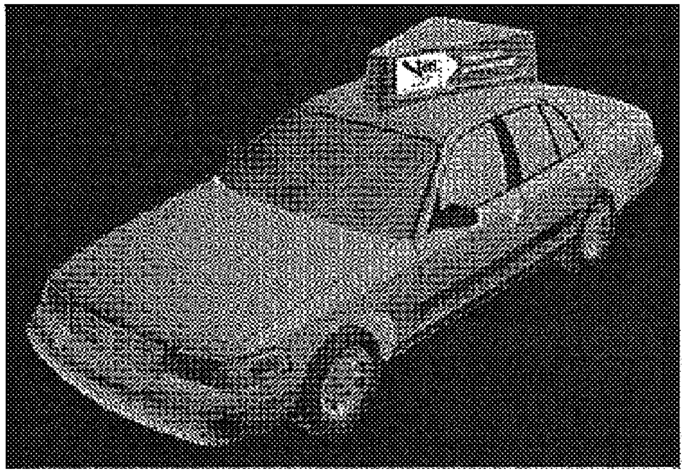
Figure 5:
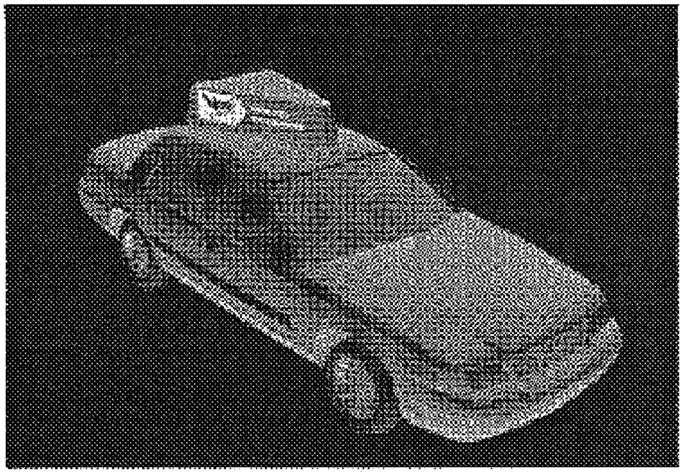
Figure 6:
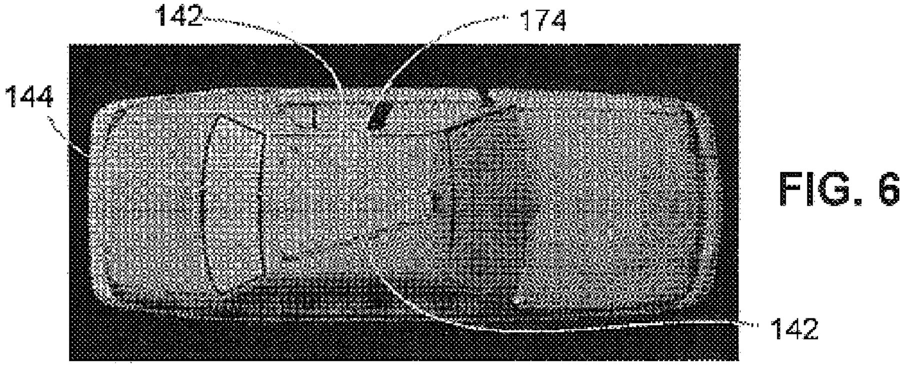

As is indicated in FIG. 8 the data transmitted by the UHF transmitter is comprised of a plurality of data streams 186. Each of these streams includes a plurality of messages 132 of different length which occur at successive times. As will be described allow, the central system transmits to each mobile unit an indication of which of the messages contained in one of the data streams it transmits the mobile unit is either to display live, or is to cache. Such control information is sent through the wireless transmitter 136 shown in FIG. 7 in many embodiments of the invention. In some embodiments of the invention such instructions are included in one or more of the UHF data streams themselves. As those skilled in the communication arts will appreciate, there are multiple methods by which one or more data streams can be encoded on a high frequency transmission signal such as those generated by UHF transmitter's.

FIG. 9 describes some of the programming 160 associated with the mobile units. In particular it describes a main loop 186 that the controller repeatedly executes during normal operation. The major function of the portion of the main loop shown in FIG. 9 is to wait for, and to respond to, messages from the central system 102 shown in FIG. 1. When such a message is received step 188 causes the steps 190 through 222 in FIG. 9 to be performed. In other embodiments other programming structures besides a main loop can be used. For example, the main loop could easily be replaced with an event driven architecture where the repeated polling is replaced with an interrupt service routine to dispatch events.

Step 190 reads the message which is been received from the central system to determine its type. If the message is a display-selection message, step 192 causes steps 194 through 214 to be performed; if it is a caching message, step 216 causes step 218 to be performed; and if it is a locator-signal-period message, step 220 causes step 222 to be performed. Although not described in this specification, other types of messages can be sent from the central system to mobile units.

If a message received from the central system is a display-selection message, steps 194 through 214 will be performed.

Step 194 performs a set of steps 196 through 210 for each of the separately controllable displays of the mobile unit. In the embodiment shown in FIG. 1 each mobile unit has two separately controllable displays. In some embodiments the mobile unit will only have one controllable display and in yet other embodiments it might have more than two.

For each separately controllable display message step 196 tests to see if the content of the display message identified in the display-selection message for the current display is contained in the display-selection message, or not. This difference is illustrated with regard to FIGS. 10 and 11. FIG. 10 shows a display-selection message 224 in which the selected messages are identified only by ID. FIG. 11 shows a display-selection message 224A that is identical to the message 224 except that in it the selected messages are actually included within the display-selection message. As can be seen by comparing FIGS. 10 and 11 both messages include a header 226; a mobile unit ID 228, which identifies the particular mobile unit to which the display-selection message is addressed; and, in some cases, a locator-signal period 234, which identifies the length of time which the mobile unit should wait between transmitting the locator signals that inform the central system of the location of the mobile unit.

Returning to FIG. 9, if the step 196 finds that the received display-selection message is of the type shown in FIG. 11, which includes the contents of selected display messages, it will cause step 198 to read that content and show it upon the associated display 142 or 144.

If the test of step 196 is not met, i.e., if the display-selection message does not contain the content of its selected display messages, then step 200 tests to see if the selected display message is stored in the mobile unit's cache memory 166 shown in FIG. 1. If so, step 202 will cause the content of the selected message to be read from memory and shown on the associated display.

If the display-selection message identifies the selected message as part of a broadcast data stream 186 of the type shown in FIG. 8, step 204 will cause steps 206 and 208 to be performed. Step 206 will cause the data stream receiver 182 shown in FIG. 7 to receive the identified display message, and step 208 will cause the identified display message to be shown on the corresponding display of the mobile unit in real-time. The steps 204 through 208 are only applicable to embodiments of the invention of the type, such as that discussed above with regard FIG. 7, which have live messages broadcast to mobile units through a data channel or stream other than data-selection messages transmitted from the central system's wireless system 134.

If none of the tests contained in step 196, 200, or 204 have been met for the current display-selection message, then step 210 will cause the controller to send a locator signal to the central system indicating that the mobile unit does not have the selected message. In many embodiments, the central system will respond by sending the contents of that message to the mobile unit or by instructing the mobile unit to display another message.

If a display-selection message includes a locator-signal-period value 234 of the type indicated in FIGS. 10 and 11, step 212 of FIG. 9 will cause step 214 to write that value into the location-signal-period variable 170 shown in FIGS. 1 and 7. This value will then be used by the mobile unit to control the frequency at which it will generate the locator signals that inform the central system of its location.

If the message received by the main loop of the mobile unit's controller shown in FIG. 9 is a caching message, step 216 will cause step 218 to cache the display message identified in the caching message. In most embodiments of the invention, a caching message will either include the contents of any that it indicates are to be cached, or, when used with embodiments of the invention having one or more broadcast data streams, such as, for example, the embodiment discussed above with regard FIG. 7, it will contain sufficient information to enable the mobile unit's broadcast receiver and stream decoder to select the desired message from a broadcast data stream, so that the messages'content can be stored in the caching memory 166.

If the message received by the new mobile unit's controller is a locator-signal-period message, step 220 will cause step 222 to store the locator-signal-period value received in that message in the locator-signal-period variable 170 shown in FIGS. 1 and 7.

FIG. 12 is a schematic representation of a locator signal message generated by some embodiments of the present invention. As is been stated above, the locator signal is generated by a mobile unit to inform the central system of the mobile unit's location. The locator signal 240 includes a header 242; a mobile unit ID 240, which enables the central system to know the identification of the mobile unit generating the locator signal; and GPS coordinates generated by the mobile unit's GPS unit 146 shown in FIGS. 1 and 7, so as to inform the central system of the mobile unit's location.

In the embodiment shown in FIG. 12 the mobile unit can also use locator signals to communicate other types of information with the central unit. For example in the embodiment shown in FIG. 11 the locator signal 240 includes the IDs 248 of each of the display messages currently shown on the separately controllable displays of the mobile unit. This information is transmitted to the central system so it can verify that the display messages that it has instructed the mobile unit to show, have, in fact, been shown for their desired duration. The locator signal 240 of FIG. 12 also includes the vehicle speed 250. This speed information enables the central system to more accurately calculate the frequency at which the mobile unit should generate locator signals, so as to best enable the central system to determine when a mobile unit crosses into a new geographic zone. The speed information can also be used to determine the nature of the content to be displayed. For example, when a vehicle is moving, fixed or slow moving content can be displayed. When the vehicle is stopped, dynamic content including full motion video can be shown.

The messages 252 and 254 shown in FIG. 11 are only sent to the central system when the mobile unit has a need to do so. The information 252 informs the central system that the mobile unit does not have the contents of a selected display message that is to be shown, as would occur if step 210 of FIG. 9 were performed. The locator signal will include the information 254 if the user enters a new desired destination for the mobile unit through the destination input 150 shown in FIGS. 1 and 7. This is a feature which would most commonly be used in embodiments of the invention in which the mobile units are taxis or other vehicles hired to take people to selected destinations.

FIGS. 13 through 15 illustrate daemons used by the mobile unit's controller to help perform various tasks. In other embodiments of the invention other programming techniques besides the use of daemons can be used to accomplish their function, including, for example, interrupts, multiple threads, separate hardware to respond to individual events, and many other known techniques.

FIG. 13 describes the locator-signal daemon 260. This demon tests to see if the time since the last transmission of a locator signal by the mobile unit equals the locator-signal period. If so, it causes step 262 to transmit a locator signal 240 of the type described above with regard FIG. 12. Among other things this enables the central system to identify the location of the mobile unit.

FIG. 14 illustrates the mobile unit's vehicle-destination input demon 264. This demon tests to see if the user has inputs a new desired destination for the mobile unit's vehicle in the destination input 150 shown in FIGS. 1 and 7. If so, it causes step 268 to send a locator signal to the central system including an intended destination field 254 of the type shown in FIG. 12. This information as to the intended destination of the vehicle helps the central system determine what message is the mobile unit should cache, and can also be used to help the mobile unit determine the locator-signal period to be used by the mobile unit.

FIG. 15 illustrates the mobile unit's speed-monitoring daemon 270. This daemon includes a step 272 which reads the vehicle speed as generated by the speed sensor 148 shown in FIGS. 1 and 7. Step 274 tests to see if the vehicle's speed or direction has changed by more than a certain amount, and, if so, causes step 276 to vary the locator-signal period accordingly. For example, if the vehicle slows down, the locator-signal period can be increased in proportion to the decrease in speed. If the vehicle's speed increases, the locator-signal period will be increased accordingly. Such changes in the locator-signal period are made because the frequency with which the mobile unit needs to inform the central system of its location in order to enable the central system to accurately determine when the mobile system makes a transition from one zone to another varies as a function of the mobile unit's closeness to a such a zone boundary and on its direction and velocity.

FIG. 16 illustrates the part 280 of the central system's programming 110, shown in FIGS. 1 and 7, which is dedicated to responding to locator signals from mobile units.

This programming includes a step 282 which causes steps 284 through 316 to be performed if a locator signal is received from a mobile unit. Step 284 associated a geographic location with the mobile unit which sent the locator signal. In embodiments of the invention in which the locator signal 240 is of the type shown in FIG. 12, the locator signal includes both the mobile unit ID 244 and GPS coordinates 246. In that case, step 284 merely associates in its memory the GPS coordinates 246 with the mobile unit's ID 244 contained in the locator signal. In some embodiments of the invention, however, the locator signal itself does not actually encode the coordinates of the mobile unit, but instead merely includes the mobile unit ID. In such embodiments, the location of the mobile unit is determined by the wireless system 134, such as by detecting the relative signal strength with which the locator signal is received by various receivers in the wireless system, by determining the relative delay with which the locator signal is received by various receivers in the wireless system, or by any of other methods by which the location of a radio signal can be determined which is either currently, or hereafter known.

Once the central system has associated a geographic location with the mobile unit which sent the locator signal that has been received, step 286 determines in which geographic zone the location associated with the mobile unit occurs. The geographic zone's defined by the zone definitions 112 shown in FIGS. 1 and 7 can be of varying size. In most embodiments, however, the zones defined by the zone definitions 112 will be larger than the resolution of the location associated with mobile units in step 284.

Next step 288 tests to see if the display messages which the field 248 of the locator signal indicates are being shown on its associated mobile unit are different than those identified by the last displays-selection message sent to the mobile unit. If so, step 290 indicates this difference in the billing database, so that advertisers will not be billed for the display of advertisements which were ordered by a display-selection message, but which were not in fact shown.

Next step 292 tests to see if the mobile unit is in a geographic zone for which different display messages should be shown than those indicated by the field 248 contained in the locator signal which is been received. If so, steps 294 through 298 are performed. Step 294 selects the display messages to be displayed by the mobile unit based on the current zone in which the mobile unit is located and the current time, by reference to the schedule 114 described above with regard FIG. 2. Next step 296 sends a display selection message to the mobile unit through the wireless system 134, identifying the selected display messages which are to be shown by the mobile unit. Then step 298 records the zone, time, and display messages associated with its display-selection message in the billing database 126 shown in FIGS. 1 and 7.

After steps 292 through 298 have been performed, step 300 records information about the location of the mobile unit derived from the current locator signal in the mobile unit's location history 128, shown in FIGS. 1 and 7. As stated above, this information is used to help determine the current speed of the mobile unit, as well as to its particular travel patterns, so the central system can help the mobile unit to more intelligently cache messages associated with geographic zones through which it is likely to travel.

Next step 302 causes steps 304 through 310 to be performed if the central system is using the variable frequency locator signals.

Not all embodiments of the invention need to use variables frequency locator signals. The use of such variable frequency locator signals, however, enables the system to achieve a higher level of accuracy at determining when a mobile unit crosses into a zone for which different display messages should be shown, using a given level of locator signal communication traffic. It does this by causing individual mobile units to vary the frequency with which they generate locator signals as a function of their closeness to geographic zone boundaries, their speed, and their direction. In such a variable frequency system, when a mobile unit is approaching a zone boundary the frequency at which it transmits locator signals is increased. When the mobile units stop moving or travel at a very slow speed, and are not close to a zone boundary the frequency at which it transmits locator signals is greatly reduced. The net effect is to greatly reduce the amount of locator signal traffic which is required to achieve a given degree of accuracy with regard to determining when mobile units cross zone boundaries.

If such a variable frequency locator signal system is being used, step 304 shown in FIG. 16 determines, from the locator signal, a distance from the mobile unit to the boundary of its current geographic zone. In some embodiments this distance will be the closest distance from the mobile unit to a boundary of a geographic zone. In other embodiments this distance will be the closest distance from the mobile unit to the boundary of the geographic zone in the direction in which the given mobile unit is traveling. Next step 306 calculates the length of time before the mobile unit is likely to reach the boundary of its current geographic zone, given the distance determined in step 304 and the speed of the vehicle. Next step 308 calculates a locator signal period based on the length of time determined in step. Finally step 310 sends a wireless locator-signal-period message to the given mobile unit containing the locator-signal. As is described above with regard FIG. 9, this will cause steps 220 and 222 of FIG. 9 to set that locator-signal period 170 shown in FIGS. 1 and 7. If the central system is sending a display-selection message to the given mobile unit at approximately the same time that it desires to send a locator-signal-period value to the mobile unit, it can include the locator-signal period in the display-selection message, as is indicated by the field 234 in FIGS. 10 and 11.

If the locator signal which has been received by the central system includes an intended destination designation 254 of the type shown in FIG. 12, step 312 will cause steps 314 and 316 to be performed. Step 314 selects a subset of display messages which are appropriate for a mobile unit to cache given its current location and the intended location identified by the field 254 shown in FIG. 12. Then step 316 sends a wireless message to the mobile unit informing it to cache the selected subset of display messages. In some embodiments of the invention the caching message sent by step 316 will actually include the content of the display messages which are to be cached within its. In other embodiments of the invention the caching message will identify messages which are to be received and cashed from another communication channel, such as from one of the broadcast data streams 186 shown in FIG. 8, which can be broadcast to the mobile units, such as by the UHF transmitter 176 shown in FIG. 7.

FIG. 7 illustrates bill generation programming 320 which can be executed by the central system. This includes programming 322 which causes the central system to generate billing records for individual advertising clients which indicate the amount of each such bill as a function of the number and length of displays of those advertiser's messages which have been shown on the system's mobile units. In many embodiments of the invention the amount billed to individual advertisers is not only a function of the number of displays which have been made of their messages, but also as a function of the location and time at which such messages have been shown.

In many embodiments of the present invention the programming of the mobile units is relatively simple. As can be seen from the above discussion the central system makes many of the decisions for the mobile unit. The central system determines when the mobile unit crosses into a geographic zone for which a different message should be display. This enables embodiments of the invention to be made in which the mobile units have no knowledge of the geographic zone definitions used by the system. It also enables embodiments in which the mobile units have no knowledge of the schedule used to determine which messages are to be display in which zones at which times. The fact that the system described above is highly centralized, and the sense that its central system makes the determinations as to when a given display message is shown on a given mobile units display, makes it substantially easier to change or update the display selection programming of the system. This is because in many cases such changes or upgrades will required no change to the software of the individual mobile units. Furthermore, entrusting the central system to make decisions as to what should be shown when and where greatly reduces the amount of information that needs to be downloaded to the mobile units, since the mobile units need not store any zone definitions, display schedules, or records of what display messages were shown at what times.

It should be understood that the foregoing description and drawings are given merely to explain and illustrate, and that the invention is not limited thereto except insofar as the interpretation of the appended claims are so limited. Those skilled in the art who have the disclosure before them will be able to make modifications and variations therein without departing from the scope of the invention. In particular, it should be noted that this application explains the present invention in more detail than is common in some patent applications, and the inventors hope they will not be punished for providing such a detailed teaching to the public by having the scope of their claims limited by the greater detail of that teaching. Punishing a more detailed teaching of an invention with a more limited interpretation of the claims would be contrary to one of the primary purposes of the patent system, which is to reward inventors for teaching their inventions to the public. Considerable thought has been put, and if the claim are amended will be put, into the wording of the following claims so that they will provide an accurate description of what we consider to be our invention, and it is hoped that the meaning of the claims will be interpreted from their own wording rather than from the particulars of the one or more embodiments of the invention described in the specification, which were not meant to limit the definitions contained in the claims. For example, where a dependent claim includes limitations not contained in a parent claim, it is our intention that such a limitation not be read into the parent claim.

Furthermore, it should be understood that the behaviors described in the pseudo-code of the drawings, like virtually all program behaviors, can be performed by many different programming and data structures, using substantially different organization and sequencing. This is because programming is an extremely flexible art in which a given idea of any complexity, once understood by those skilled in the art, can be manifested in a virtually unlimited number of ways. Thus, the claims are not meant to be limited to the exact steps and/or sequence of steps described in the pseudo-code of the drawings. This is particularly true since the pseudo-code described in the text above has been highly simplified to let it more efficiently communicate that which one skilled in the art needs to know to implement the invention without burdening him or her with unnecessary details. In the interest of such simplification the structure of the pseudo-code described above often differs significantly from the structure of the actual code that a skilled programmer would use when implementing the invention. Furthermore, many of the programmed behaviors which are shown being performed in software in the specification could be performed in hardware in other embodiments.

In the embodiments of the invention discussed above, almost all of the various aspects of the invention are shown occurring together in a system. It should be understood that in other embodiments of the invention different subsets of one or more individual features of the invention will occur in a given system. For example, not all embodiments of the invention need to use the caching of display messages, or the receipt of broadcast messages from one or more data streams, or the use of variable frequency locator signals, or the of a destination input.

It should be understood that the controller of the mobile unit and the processor of the central system might each actually contain more than one processor in some embodiments of the invention. Furthermore, on it should be understood that in some embodiments of the invention the central system might be distributed, and, thus, made of a plurality of separate computing systems, each with communication capability, whether there is a wireless transmitter and receiver separately associated with each such distributed computing system, or whether they are part of a unified communication system. Preferably in such distributed system all of the separate computer systems will be networked together so that the multiple computer systems can operate as a unit.

In the embodiment of the invention shown in FIGS. 1 and 7 the positioning system used in the mobile unit is a GPS system. In other embodiments of the invention any other currently or hereafter known location determining system could be used. As is discussed above, in some embodiments of the invention the mobile unit need not have a position determining system at all, and the wireless system used by the central system will locate the mobile unit based on information determined from the receipt of that message by various receivers within that wireless system.

In the embodiment of the invention shown in FIGS. 1 and 7 the locator signals are transmitted by the same wireless system which is used to receive display-selection messages from the central system. It should be understood that in other embodiments of the invention the locator signals can be transmitted by a separate radio transmitter. For example, in some such embodiments the wireless system used for most data communication between the mobile units and the central system could be a cellular system, whereas the locator signals can be transmitted by separate radio transmitters which is not part of the cellular system. In some such embodiments, the locator signals transmitted can contain little more information than an identification of the mobile unit itself. In such case, the central system of what include additional wireless receivers designed to receive and determine the location of the transmission of such locator signals.

What we claim is:

1. A system for displaying messages on one or more mobile units as a function of the mobile units location, said system comprising:

- at least one mobile unit in the form of a vehicle capable of moving in geographic space which includes:
  - a display visible from outside the vehicle;
  - a wireless communication system including:
    - a transmitter for repeatedly transmitting messages, said messages including a locator signal which enables a central system to determine the mobile unit's location;
    - a receiver for receiving display messages from a central unit and for receiving display-selection messages which do not contain advertising information; and
  - a controller programmed to:
    - control the contents shown on said display;
    - read display messages received by the wireless receiver; and
    - read and respond to the display-selection messages which do not contain advertising information from the central system by causing said display to show the selected display message identified in said display-selection message;
- a central system including:
  - a wireless communication system including:
    - circuitry for receiving wireless messages from mobile units, said messages, including said locator signals;
    - circuitry for sending the wireless display messages and for sending the display-selection messages which do not contain advertising information to mobile units;
  - a memory for storing a plurality of geographic zone definitions and a indication of which of a plurality of display messages is to be displayed by one or more of said mobile units in each of said zones;
  - a processor programmed to:
    - associate a geographic location with a given mobile unit based on information derived from the receipt of a locator signal from the given mobile unit;
    - determine which of a plurality of geographic zones the geographic location associated with the given mobile unit is located;
    - selecting a given display message from a plurality of display messages to be displayed by the given mobile unit based on the geographic zone in which the given mobile unit's associated geographic location is located;
    - sending the wireless display-selection message which does not contain advertising information to the given mobile unit identifying the selected display message to be shown on the given mobile unit's display.

2. A system as in claim 1 wherein the mobile unit's display is mounted on the exterior of the mobile unit's vehicle.

3. A system as in claim 1 wherein:

- said mobile unit further includes a memory storing a plurality of display messages; and
- said mobile unit's controller is programmed to respond to a display-selection message from the central system by causing the identified selected display message to be read from memory and shown on the display.

4. A system as in claim 3 wherein the processor of the central system is programmed to:

- select a sub-set of a larger set of display messages which are to be cached by storage in the memory of a given mobile unit; and
- send a wireless caching message to the given mobile unit causing the given mobile unit to cache the selected sub-set of display messages.

5. A system as in claim 4 wherein said caching selection is made as a function of one or more of said geographic locations which have been associated with the given mobile unit at one or more times.

6. A system as in claim 5 wherein:

- a given mobile unit includes an input device enabling a user of the mobile unit's vehicle to input an intended destination for the mobile unit;
- the given mobile unit's controller is programmed to cause a wireless message to be sent informing the central system of the intended destination; and
- said caching selection is also made as a function of an intended destination communicated to the central system by the given mobile unit.

7. A system as in claim 4 wherein:

- the central system includes a broadcast transmitter which broadcasts one or more data streams which can be simultaneously received by multiple mobile units, each of which data streams contains one or more display messages; and
- the caching message sent to a given mobile unit instructs the given mobile unit to cache one or more selected messages from said one or more of the broadcast streams.

8. A system as in claim 7 wherein said broadcast transmitter is a UHF television station.

9. A system as in claim 4 wherein the caching message includes the sub-set of display messages which the central system has selected for caching by the given mobile unit.

10. A system as in claim 1 wherein:

the central system includes a broadcast transmitter which broadcasts one or more data streams which can be simultaneously received by multiple mobile units, each of which data streams contains one or more display messages; and a display-selection message is addressed to a subset of one or more of said mobile units instructing the members of the subset to display a selected one of the display messages contained in said one of said broadcast data streams;

the mobile units includes a data-stream receiver capable of receiving a selected display message from one of said broadcast data streams; and the mobile unit's controller is programmed to respond to the receipt of a display-selection message by:

causing the data-stream receiver to receive the display message identified in the selected-display message; and causing the identified display message to be shown on the mobile unit's display.

11. A system as in claim 10 wherein said broadcast transmitter is a UHF television station.

12. A system as in claim 10 wherein said mobile unit's controller is programmed to cause the identified display message to be shown on the mobile unit's display in real time as it is received from a data stream.

13. A system as in claim 1 wherein:

said mobile unit includes a GPS system for determining the geographical coordinates of said mobile unit; and said locator signal contains geographical coordinates information derived from said GPS system.

14. A system as in claim 1 wherein:

the locator signal broadcast by a mobile unit does not contain encoded geographical location information; and the central system associates said geographical location with a given mobile unit based on information about the receipt of the locator signal obtained by the wireless communication system which receives such signals.

15. A system as in claim 1 wherein:

said mobile unit has a plurality of displays visible from outside its vehicle;

the processor of the central system contains programming to separately select a given message from a plurality of messages to be displayed on each of said plurality of displays;

said display-selection message can include information informing a mobile unit to display different selected messages on each of its plurality of displays; and the mobile units controller contains programming to cause it to respond to a display-selection message from a central system identifying a separate display message to be shown on each of said plurality of displays by causing each of said identified display messages to be shown in a corresponding one of said displays.

16. A system as in claim 1 wherein the central system's processor is programmed to select the display message to be shown by a given mobile unit based not only on the geographic zone in which the given mobile vehicle is located but also as a function of the current time.

17. A system as in claim 16 wherein:

the central system contains a memory storing a schedule which indicates which messages are to be displayed in which geographic zones at what times; and the central system's processor is programmed to use the information stored in said schedule when making the selection of which display message is to be shown a given mobile unit as a function of both its geographic zone and the current time.

18. A system as in claim 16 wherein:

the central system's processor records information on how much one or more messages have been shown by one or more mobile units within one or more geographic zones during one or more time periods; and the central system's processor is programmed to use said information when making the selection of which display message is to be shown by a given mobile unit in a given zone at a given time.

19. A system as in claim 1 wherein the central system's processor is programmed to perform record keeping, including keeping record of which display messages are shown by mobile units and when such messages are so shown.

20. A system as in claim 19 wherein said record keeping tasks further include keeping record of where individual display messages are so shown.

21. A system as in claim 19 wherein said record keeping tasks further include generating billing information from said information about which messages have been displayed at which times.

22. A system as in claim 1 wherein the central system's processor is programmed to record information about the location of each of a plurality of said mobile units, derived from the locator signals transmitted by such mobile units, at each of successive times, so as to record a history of the travel of each such mobile unit.

23. A system as in claim 1 wherein:

the central system's processor is programmed to:

determine, based on the receipt of a locator signal from a given mobile unit, how close the given mobile unit is to the boundary of the geographic zone in which is located;

calculate how long it should be before the given mobile unit transmits each of one or more subsequent locator signal as a function of how close the given mobile unit is to the boundary of the geographic zone in which it is located; and send a wireless locator-signal-period message to the given mobile unit containing the results of said calculation; and the controller of the given mobile unit is programmed to respond to the receipt of one of said locator-signal-period messages by causing the timing of the subsequent transmission of one or more of the given mobile unit's locator signals to be controlled as a function of information contained in said locator-signal-period message.

24. A system as in claim 23 wherein said calculation of how long it should be before the given mobile unit transmits each of one or more subsequent locator signal is also made as a function of the speed of the given mobile unit.

25. A system as in claim 1 wherein:

the mobile unit includes a sensor for measuring the speed of the mobile unit;

the mobile unit's controller is programmed to vary the time between the transmission of locator signal's as a function of the speed of the vehicle as measured by said sensor.

26. A central system for use as part of a larger system for displaying mobile messages on each of one or more mobile units, said central system comprising:

one or more wireless receivers for receiving a locator signal broadcast by one of said mobile unit;

a wireless communication system including:

circuitry for receiving wireless messages from mobile units, said messages including locator signals transmitted by individual mobile units to enable the central system to determine the individual location of such mobile units;

circuitry for sending wireless display messages and for sending display-selection messages which do not contain advertising information to mobile units;

a memory for storing a plurality of geographic zone definitions and a indication of which of a plurality of display messages is to be displayed by one or more of said mobile units in each of said zones; and one or more processors programmed to:

associate a geographic location with a given mobile unit based on information derived from the receipt of a locator signal from the given mobile unit;

determine which of a plurality of geographic zones the geographic location associated with the given mobile unit is located;

selecting a given display message from a plurality of display messages to be displayed by the given mobile unit based on the geographic zone in which the given mobile unit's associated geographic location is located;

sending the wireless display-selection message which does not contain advertising information to the given mobile unit identifying the selected display message to be shown on the given mobile unit's display.

27. A mobile unit for use in a system for displaying messages on each of one or more such mobile units under command from a central system, said mobile unit comprising:

a vehicle capable of moving in geographic space which includes:

a display visible from outside the vehicle;

a wireless communication system including:

a transmitter for repeatedly transmitting a locator signal which enables a central system to determine the mobile unit's location;

a receiver for receiving display messages from a central unit and for receiving display-selection messages which do not contain advertising information; and a controller programmed to:

control the contents shown on said external display;

read the display messages received by the wireless receiver; and read and respond to the display-selection messages which do not contain advertising information from the central system by causing said display to show the selected display message identified in said display-selection message;

wherein said mobile unit has no knowledge of at what geographic boundaries it should change displays of messages.

28. A method for displaying messages on one or more mobile units as a function of the mobile units location, said method comprising:

having one or more mobile units travel through geographic space;

having each mobile unit repeatedly transmitting a locator signal which enables a central system to determine the mobile unit's location;

having the central system:

associate a geographic location with a given mobile unit based on information derived from the receipt of a locator signal from the given mobile unit;

determine which of a plurality of geographic zones the geographic location associated with the given mobile unit is located;

select a given display message from a plurality of display messages to be displayed by the given mobile unit based on the geographic zone in which the given mobile unit's associated geographic location is located; and sending a wireless display-selection message which does not contain advertising information to the given mobile unit identifying a selected display message to be shown on the given mobile unit's display; and having the given mobile unit respond to the receipt of said display-selection message which does not contain advertising information sent to it by causing said publically visible display on the given mobile unit show the selected display message identified in said display-selection message.

* * * * *